(12) United States Patent
Antell

(10) Patent No.: US 10,015,552 B2
(45) Date of Patent: Jul. 3, 2018

(54) METHOD OF VALIDATING AN ELECTRONIC VOTE

(71) Applicant: YOUR VIEW LTD, Sutton Surrey (GB)

(72) Inventor: Bob Antell, Upminister (GB)

(73) Assignee: Your View Ltd., Sutton Surrey (GB)

( * ) Notice: Subject to any disclaimer, the term of this patent is extended or adjusted under 35 U.S.C. 154(b) by 0 days.

(21) Appl. No.: 14/492,859

(22) Filed: Sep. 22, 2014

(65) Prior Publication Data

US 2015/0012930 A1 Jan. 8, 2015

Related U.S. Application Data

(63) Continuation of application No. 13/499,971, filed as application No. PCT/GB2010/051522 on Sep. 13, 2010, now abandoned.

(30) Foreign Application Priority Data

Oct. 5, 2009 (GB) .................................. 0917380.8

(51) Int. Cl.

| G06F 15/16 | (2006.01) |
|---|---|
| H04N 21/475 | (2011.01) |
| H04H 60/33 | (2008.01) |
| H04N 21/433 | (2011.01) |
| H04N 21/8547 | (2011.01) |

(52) U.S. Cl.
CPC ........ *H04N 21/4758* (2013.01); *H04H 60/33* (2013.01); *H04N 21/433* (2013.01); *H04N 21/8547* (2013.01)

(58) Field of Classification Search
CPC ....... H04L 63/08; H04L 63/10; H04L 67/306; H04L 12/581; H04L 2209/463
USPC ......................................................... 709/206
See application file for complete search history.

(56) References Cited

U.S. PATENT DOCUMENTS

| 2001/0042005 A1* | 11/2001 | McClure ................ G07C 13/00 |
|---|---|---|
| | | 705/12 |
| 2003/0094489 A1 | 5/2003 | Wald |
| 2007/0241190 A1 | 10/2007 | Hotto et al. |

(Continued)

FOREIGN PATENT DOCUMENTS

WO 2009006552 A1 1/2009

OTHER PUBLICATIONS

Search Report from International Patent Application No. PCT/GB2010/051522 dated Nov. 5, 2010.

*Primary Examiner* — SM Rahman
(74) *Attorney, Agent, or Firm* — Baker & Hostetler LLP

(57) ABSTRACT

An electronic voting method, system and apparatus is disclosed. A vote message is received at a network node, the vote message comprising a sender identifier, event identifier and a timestamp. The sender identifier, event identifier and timestamp are read, and it is determined from the timestamp that an event window was open and whether the window was a first or subsequent window. In the event that the window is the first window, the vote and sender identifier are stored at a database. In the event that the window is a second or subsequent window, the sender identifier is compared to sender identifiers stored at a previous window and if a match is found the vote is marked as validated and the vote stored at the database.

10 Claims, 7 Drawing Sheets

(56) References Cited

U.S. PATENT DOCUMENTS

2008/0256002 A1* 10/2008 Yoshida ................ G06Q 10/10
                                                                 705/500
2011/0238463 A1* 9/2011 Marchal ................ G07C 13/00
                                                                 705/12

* cited by examiner

METHOD OF VALIDATING AN ELECTRONIC VOTE

REFERENCE TO RELATED APPLICATIONS

This application is a Continuation Application of U.S. patent application Ser. No. 13/499,971, filed on Apr. 3, 2012, which is a National Stage Application of International Patent Application No. PCT/GB2010/051522, filed on Sep. 13, 2010, which claims priority to British Patent Application no. 0917380.8, filed on Oct. 5, 2009, the disclosures of which are incorporated by reference in their entirety.

TECHNICAL FIELD

This description relates generally to electronic voting and more specifically to validating votes sent responsive to events occurring in an interactive broadcast video.

BACKGROUND

Electronic voting systems enable a user (i.e. a voter) to rapidly provide voting information to a central entity by utilising one or more of the variety of communication networks commonly available. Subsequent to votes being received, electronic voting systems also enable the results to be calculated and disseminated in near real-time.

Electronic voting is frequently used to provide user interactivity for broadcast television content. For example, viewers of the broadcast are able to vote on an act in a talent show or answer a question in a quiz show. The 'uplink' from the viewer to the broadcaster can be provided by, for example, the PSTN via a touch-tone telephone, a mobile communication network's short message service (SMS) or the internet. To determine the result, the votes can be simply aggregated and the results can be presented as part of the broadcast itself. A time-cut off is generally provided, before which a vote must be received to be counted.

However, such voting systems are very simplistic, as they only provide a single snapshot on the user's opinion on the broadcast event. In particular, they do not enable any determination of how additional information provided in the broadcast affects the opinions of the users. For example, after the event has occurred and users can start voting, subsequent information can affect the initial impressions of the user. As a result of this, the user can, for example, change their mind. In some examples, the submission of a second vote by the user as a result of changing their mind only serves to cancel out the overall effect of the previous vote. This type of data cannot be captured nor handled by the above-mentioned electronic voting systems.

There is therefore a need for a technique to enable electronic voting on events occurring in a real-time video broadcast that handles and determines the impact of additional information on voting results without interrupting the display of the broadcast. There is also a need for a technique that achieves this whilst providing voting accuracy despite the limitations of communication networks such as transmission delays and congestion, and is scalable to demand yet simple enough to be cheaply deployed to end users.

SUMMARY

According to one aspect of the invention, there is provided a computer-implemented method of validating an electronic vote, comprising: receiving at a network element via a communication network a vote message comprising a sender identifier, vote data and a timestamp; determining from the timestamp that the vote message was received in a time window relating to an event; accessing stored messages received at the network element during a previous time window relating to the event and stored at a data storage node; validating the vote message by matching the sender identifier to a stored sender identifier in one of the stored messages; and storing the validated vote message at the data storage node.

Because the vote message is validated by ensuring the same sender identity voted in a previous time window, it can be ensured that a vote received in the later time window is not a delayed vote that was intended to be received in the previous time window. This ensures that network delays or congestion do not affect the accuracy of the voting results by erroneously counting a vote intended for a different time window.

In preferred embodiments, the event is an event occurring in a real-time video broadcast. The start of the time window relating to the event may be defined by the time of broadcast of additional information regarding the event. The end of the previous time window relating to the event may be defined by the time of broadcast of the additional information regarding the event. The start of the previous time window relating to the event may be defined by the first time of broadcast of the event.

Because, the time window relates to a period following the provision of additional information to a user, and the previous time window relates to a period starting with the initial broadcast of the event and ending with the provision of the additional information, the impact of the additional information on the voting of the users can be determined.

Preferably, the method further comprises the step of comparing the vote data from the validated vote message to vote data from the stored message having the corresponding sender identifier. By comparing the votes in the two time windows, it can be determined whether the additional information caused the user to change their mind and consequently change vote.

Preferably, the method further comprises the steps of: repeating the steps of the method to obtain a plurality of validated vote messages; and generating statistics from the vote data in the plurality of validated vote messages and the stored messages. Repeating the steps of the method enables a statistically meaningful sample of votes to be processed.

Preferably, the vote data comprises a vote code indicating a voter's opinion regarding the event. By using a vote code to represent the user's opinion the size vote message can be kept compact. This reduces the network congestion caused by many votes being transmitted simultaneously and reduces the processing demands.

In embodiments, the vote message further comprises an event identifier, and the step of determining further comprises verifying that the event identifier identifies the event, and the step of validating the vote message further comprises matching the event identifier to a stored event identifier in the one of the stored messages. The provision of an event identifier ensures that a given vote message can be accurately associated to a particular event. This avoids votes being associated to the wrong event, for example if overlapping time windows are present.

Preferably, the method further comprises the step of transmitting a notification message to at least one user terminal indicating the start of the time window. The notification message enables the accurate opening of the time window. The notification message can also provide the event identifier to the user terminal.

In embodiments, the method further comprises the steps of: receiving at a front-end server an unprocessed message comprising the sender identifier and vote data; determining the time of receipt of the unprocessed message at the front-end server; adding the time of receipt to the unprocessed message as the timestamp to form the vote message; and providing the vote message to the network element.

The front-end server enables a large number of votes to be received without overloading the network element performing the validation process. The front-end server is responsible for time-stamping the messages to ensure that they are rapidly given a time of receipt, and hence can be associated with the correct time window. This process can be performed very rapidly, enabling the handling of the arrival of many votes in a short time period. They can then be provided to the network element for processing without risk of processing delays affecting the results. The use of the front-end server also avoids the need for all the user terminals to be synchronised to a common time signal.

According to another aspect of the invention, there is provided a computer program comprising computer program code means adapted to perform all the steps of the above method when said program is run on a computer. Preferably, the computer program is embodied on a computer readable medium.

According to another aspect of the invention, there is provided a networked server computer, comprising: at least one processor; a data store; a communication interface connected to a communication network and arranged to receive a vote message comprising a sender identifier, vote data and a timestamp; and a memory arranged to store executable instructions arranged to cause the at least one processor to: determine from the timestamp that the vote message was received in a time window relating to an event; access stored messages received during a previous time window relating to the event and stored in the data store; validate the vote message by matching the sender identifier to a stored sender identifier in one of the stored messages; and store the validated vote message in the data store.

According to another aspect of the invention, there is provided an electronic vote validation system, comprising: the above networked server computer; and at least one front-end server computer comprising: at least one processor; a communication interface connected to the communication network and arranged to receive an unprocessed message comprising the sender identifier and vote data; and a memory arranged to store executable instructions arranged to cause the processor to: determine the time of receipt of the unprocessed message at the at least one front-end server; add the time of receipt to the unprocessed message as the timestamp to form the vote message; and provide the vote message to the networked server computer via the communication interface.

The methods described herein may be performed by software in machine readable form on a storage medium. The software can be suitable for execution on a parallel processor or a serial processor such that the method steps may be carried out in any suitable order, or simultaneously.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented for voting as part of a broadcast video system, the system described is provided as an example and not a limitation. As those skilled in the art will appreciate, the present examples are suitable for application in a variety of different types of electronic voting systems.

The example described herein is an electronic voting method, system and apparatus that enables users to vote on events occurring in a real-time video broadcast in which additional information is provided over the course of the broadcast. This is described using the purely illustrative application of a football broadcast. In the context of the football broadcast, the presented electronic voting technique enables users (e.g. a viewing audience) to provide real-time input on their opinions on referee decisions (e.g. penalty awards, offside decisions, etc) both prior and subsequent to the benefit of additional information such as replays (e.g. slow motion replays, different camera angles, etc). This therefore provides the basis of a measurable input to one of the most talked about issues in sport i.e. 'was the referee right?'

However, it will be readily understood that this is merely an illustrative application of the electronic voting technique, and the technique could also be used with other broadcasts such as different sports, or with any broadcast having an 'evolving' situation, or where viewers are subject to the presentation of additional information from a different perspective. This includes, but is not limited to, 'who done it' detective mysteries, courtroom dramas, political broadcasting/polling, and advertising research. In further alternatives, the technique could also be used with 'live' events, such as sports games viewed live in a stadium, and where replays are presented on a display screen.

Figure 1:
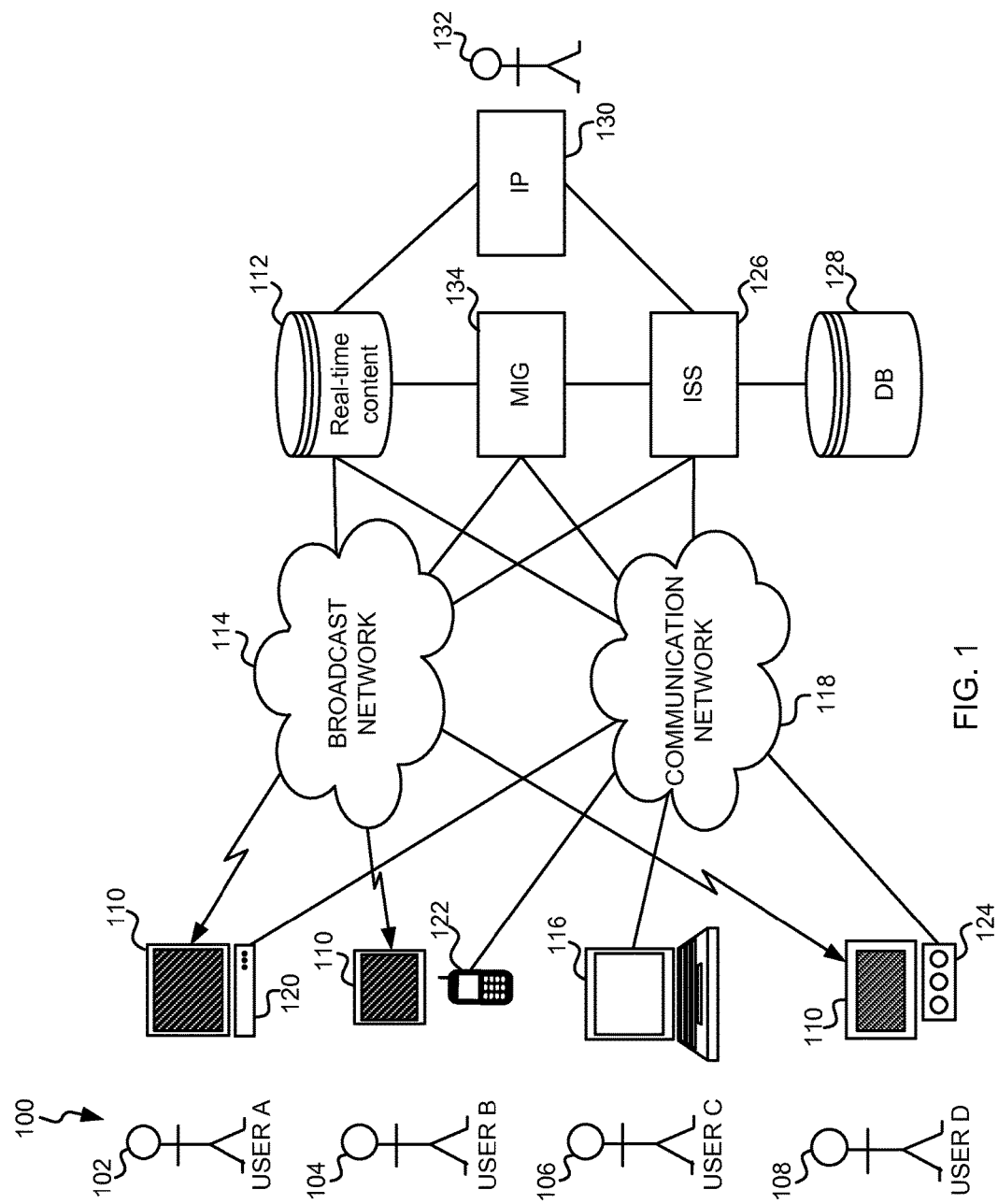
FIG. 1 illustrates a schematic diagram of an electronic voting system.

Reference is first made to FIG. 1, which illustrates a schematic diagram of a network in which the electronic voting technique can be applied alongside broadcast video content. FIG. 1 shows a plurality of users 100, and in this example four users are shown: user A 102; user B 104; user C 106 and user D 108. Each of the users 100 are using user terminal equipment enabling them to receive and view broadcast content. For example, users A 102, B 104 and D 108 are each using television equipment 110 to view real-time content 112 transmitted over a broadcast network 114, and user C 106 is using a personal computer 116 to view the real-time content 112 over a communication network 118 (e.g. streamed over the Internet).

The broadcast network 114 can be, for example, a terrestrial, satellite or a cable network using either analogue or digital transmission techniques. The communications network 118 can comprise at least one of: the Internet, a mobile communication data network (e.g. GPRS, UMTS or HSDPA), the PSTN, a wired or wireless local area network (e.g. Ethernet or WiFi), a wide area network, a data-bus internal to a computing device, or any combination thereof.

In addition to receiving broadcast video, each of the users 100 is also able to transmit data using the communication network 118. The transmission of data from the users 100 to the communication network 118 can be considered to be an uplink or back-channel communication link. Any suitable device can be used by the users 100 to transmit data over the communication network 118, and the device used can depend upon the available communication networks and requirements of the user. FIG. 1 illustrates several example uplink devices, as outlined below.

Firstly, user A 102 is operating a set-top box 120 (STB) connected to the communication network. The STB 120 can be controlled by user A 102 using a remote control unit (not shown in FIG. 1). The STB 120 is arranged to transmit messages over the communication network 118 responsive to commands from user A 102. Note that the STB 120 can be used for decoding broadcast signals as well as transmitting uplink messages.

Secondly, user B 104 is operating a mobile telephone 122 arranged to communicate with and transmit data to the communication network. Thirdly, user C 106 is operating the personal computer 116, which, in addition to receiving streamed video over the communication network, is also arranged to transmit messages to the communication network 118. Fourthly, user D is operating a dedicated hardware device 124 in the form of a set of buttons, each of which sends a particular message over the communication network 118. The dedicated hardware device 124 can comprise, for example, a plurality of physical buttons or a touch screen displaying a plurality of soft buttons.

The users 100 can be located in any location that is suitable for them to view the broadcast content. For example, one or more of the users 100 can be in their homes, in a public place such as a bar or stadium, or in a studio as part of an audience or on-screen (e.g. if the users are pundits or experts). The dedicated hardware device 124 mentioned above can be particularly preferable in the case of in-studio users.

As mentioned, the system of FIG. 1 enables the users 100 to vote on events occurring in the real-time content 112 sent over the broadcast network 114. The core functionality of the electronic voting is implemented using a networked element referred to herein as an information sequence system (ISS) node 126. The operation of the ISS node 126 is described in more detail hereinafter. The ISS node 126 is connected to the communication network 118 and, optionally, the broadcast network 114.

The ISS node 126 is also connected to a data storage node 128. The data storage node 128 can be in the form of a database used to store votes. In some examples, the functionality of the ISS node 126 and the data storage node 128 can be integrated into a single physical unit, such as a server.

The ISS node 126 is further connected to an incident picker (IP) node 130. The IP node 130 also has an input from the real-time content 112. The IP node determines or selects incidents (or events) from the real-time content on which the users 100 are able to vote. Preferably, the IP node 130 is operated under the control of an operator 132, who can be, for example, a TV broadcast producer/editor, a person that is part of the broadcast (such as a pundit), or one or more of the users 100.

The ISS node 126 is also connected to a 'more information' generator (MIG) node 134. The MIG node 134 receives an input from the real-time content 112, and provides data regarding the additional information that can affect the voting process (as described in more detail below). In some examples, the MIG node 134 is responsible for generating the additional information, and can be in the form of a video replay system, a $3^{rd}$ party decision prediction device (such as Hawk-Eye) or a system for detecting triggers denoting the broadcast of specific evolving information in the broadcast. In the case that the MIG node 134 is responsible for generating the additional information, the MIG node 134 is connected to the broadcast network 114 to enable the additional information to be transmitted to the users 100.

Figure 2:
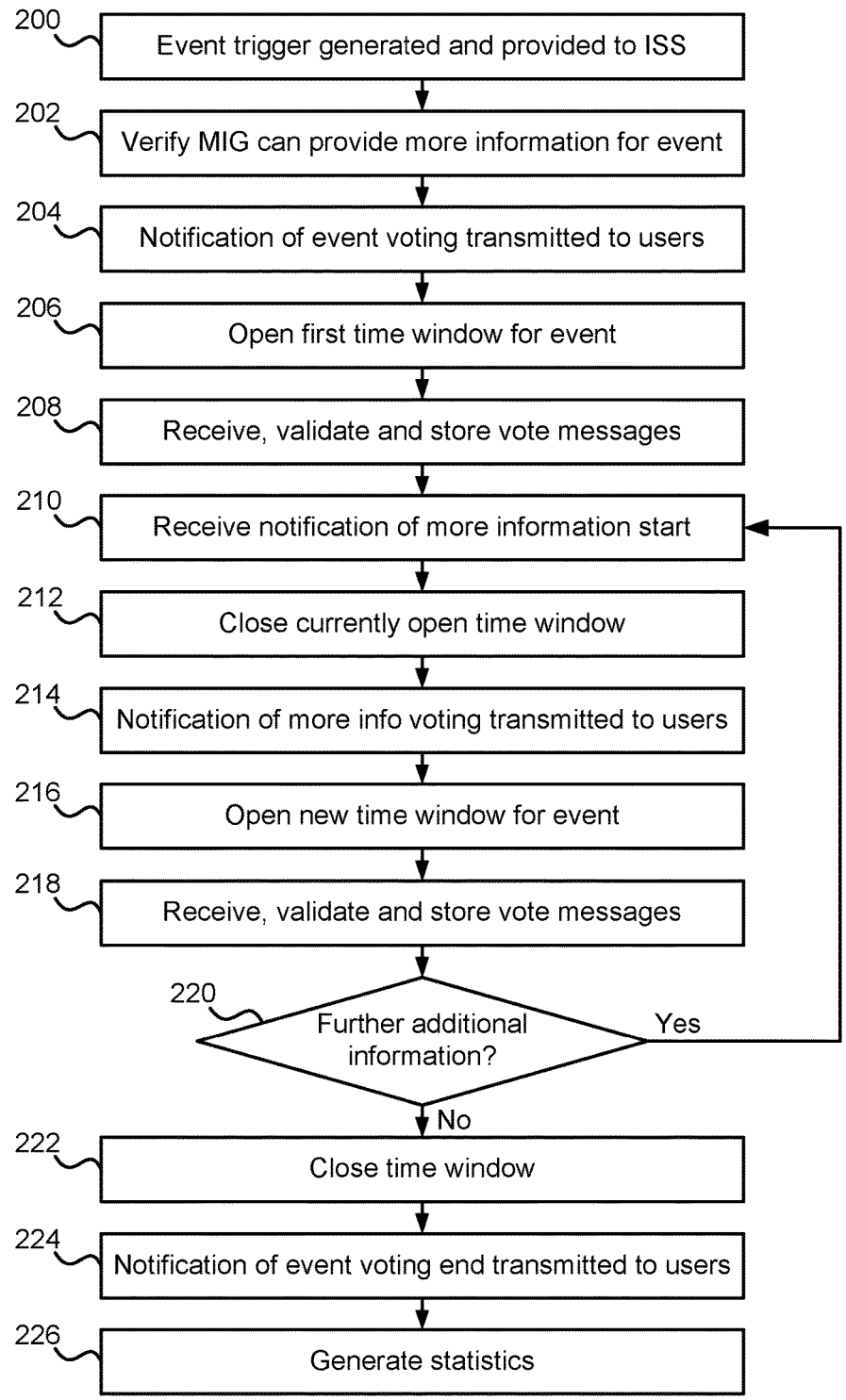
FIG. 2 illustrates a flowchart of a process for electronic voting.

Reference is now made to FIG. 2, which shows a flow-chart of a process for operating the system illustrated in FIG. 1. Firstly, in step 200, an event trigger is generated and provided to the ISS node 126. The event trigger notifies the ISS node 126 that an event is occurring or has occurred in the real-time content that can be voted upon. Preferably, the event trigger comprises an optional unique event identifier, the function of which is described hereinafter. The event trigger can be provided by the IP node 130 and either automatically generated or manually generated by operator 132. In alternative examples, the event trigger and event identifier can be generated within the ISS node 126 itself. In a further alternative example, the event trigger can be provided to the ISS node 126 from the IP node 130, and the event identifier generated by the ISS node 126.

In the football game example, the event can be a foul on a player on which the referee has made a decision. When the foul occurs, the operator 132 can determine that this is an event suitable for viewer voting, and generate the event trigger to initiate the electronic voting process.

The ISS node 126 receives and processes the event trigger, and initiates the voting process. In step 202, the ISS node 126 communicates with the MIG node 134 to verify whether additional information will be available for the event in question, and to prepare the MIG node 134 for the transmission of this additional information. Preferably, the ISS node 126 informs the MIG node 134 of the event identifier as part of this communication. In the football game example, the additional information generated by the MIG node 134 can be a replay of the foul event.

Once the MIG node 134 has confirmed to the ISS node 126 that additional information will be available for the event, the ISS node 126, in step 204, transmits a notification to the users 100 that the event can be voted upon. Preferably, this is performed by augmenting the broadcast video sent over the broadcast network 114 such that the notification is displayed upon the television equipment 110, personal computer 116 or other device that the users 100 are using to view the real-time content 112. This augmentation can be in the form of an icon, widget or message overlaid on the broadcast video. Optionally, the event identifier can be notified to the users 100 as part of the icon, widget or message. In alternative examples, rather than augmenting the real-time content, a separate notification message can be transmitted over the communication network 118 to the uplink devices (STB 120, mobile telephone 122, personal computer 116 and/or dedicated device 124) of the users such that the notification is displayed on or via these devices. A notification message transmitted over the communication network 118 can also include the event identifier.

Once the notification message has been transmitted, a first time window for voting on the event is opened in step 206. The first time window defines a time period during which valid votes on the event can be submitted by the users 100. The users 100 can submit votes using their uplink devices. The votes are in the form of vote messages transmitted over the communication network to the ISS node 126. The structure and content of the vote messages are described in more detail hereinafter.

For example, user A 102 can make a vote using the remote control device to operate the STB 120, which transmits a vote message over the communication network to the ISS node 126. User B 104 can transmit a vote message over the communication network by selecting a button or control displayed in a user interface of the mobile telephone 122, by sending an SMS comprising the vote, or by dialing a number and entering the vote using touch-tones or voice input. User C 106 can submit a vote by selecting an option, button or control displayed in a user interface of the personal computer 116, which causes the personal computer 116 to transmit a vote message over the communication network to the ISS node 126. User D can vote by selecting one of the buttons or control on the dedicated hardware device 124, which then transmits a vote message over the communication network to the ISS node 126. In the case of the football game example, the users can vote, for example, on whether they thought the referee's decision on the foul was right, wrong, or are unsure.

In step 208, the ISS node 126 receives, via the communication network 118, vote messages from the users 100, and validates and stores them in the data storage node 128. The processes of step 208 are outlined in more detail with reference to FIG. 3, described below after the description of FIG. 2.

In step 210, the ISS node 126 receives a notification from the MIG node 134 that more information relevant to the event is to be broadcast. For example, in the case of the football game, the additional information from the MIG node 134 can be in the form of a replay of the foul, or a different camera angle. Responsive to this notification, the ISS node 126 closes the first time window in step 212. The closure of the first window can be immediate, or scheduled to occur after a set period of time, depending on the information from the MIG node 134 regarding when the additional information is to be broadcast. Alternatively, the closure of the first window can be after the analysis of other parameters relevant to the event The ISS node 126 sends a notification message to the users that additional voting is available on the event. This notification message can be timed to be displayed concurrently with or prior to the display of the additional information. Preferably, the notification message augments the broadcast video sent over the broadcast network 114 such that the notification is displayed upon the television equipment 110, personal computer 116 or other device that the users 100 are using to view the real-time content 112. As with step 204, this augmentation can be in the form of an icon, widget or message overlaid on the broadcast video, or a separate notification message transmitted over the communication network 118 to the uplink devices of the users such that the notification is displayed on or via these devices. The notification message can also include the same event identifier as in step 204, as the additional information relates to the same event.

Note that, in preferred examples, the additional information is delivered to the user via the broadcast network. However, in other examples the additional information can be provided by the ISS node 126 via the communication network 118, and viewed on the uplink device.

In step 216 the ISS node 126 opens a new time window for votes to be received in light of the additional information. In step 218, the ISS node 126 receives, via the communication network 118, vote messages from the users 100, and validates and stores them in the data storage node 128. The processes of step 218 are outlined in more detail with reference to FIG. 3, described below. In particular, step 218 validates the votes to ensure that votes that were sent during the first window, but delayed in transmission are not counted in the second or subsequent windows.

In the case of the football game example, the users 100 can decide whether, after viewing the replay, they now think that the referee decision was right, wrong, or are unsure. Hence, for this example, after additional information is supplied for the event there are nine permutations per voter:

Referee Right/Referee Right
Referee Right/Referee Wrong
Referee Right/Unsure
Referee Wrong/Referee Wrong
Referee Wrong/Referee Right
Referee Wrong/Unsure
Unsure/Referee Right
Unsure/Referee Wrong
Unsure/Unsure For situations where the application involves a series of evolving events the number of permutations per voter is $V^{N+1}$, where V is the number of input options (right, wrong, unsure, etc.) and N is the number of additional information events.

In step 220 it is determined whether further additional information is to be broadcast regarding the event. For example, further camera angles, super slow-motion footage or opinions from pundits can be broadcast regarding the football game. If this is the case, then steps 210 to 218 are repeated, such that the current window is closed and another one opened so that users can vote after the further additional information.

Once no further additional information is to be broadcast regarding the event, then in step 222 the time window is closed and in step 224 the ISS node 126 informs the users 100 that the voting for the event in question is closed.

The ISS node 126 can then generate (if desired) near instant statistics and correlation results. For example, in the football game, the statistics can indicate that after the foul, 75% of the total participating audience agreed with the referees decision prior to the replays, but only 40% agreed after the transmission of the replay. The statistics can be used immediately as part of the broadcast content, and discussed or analysed.

Figure 3:
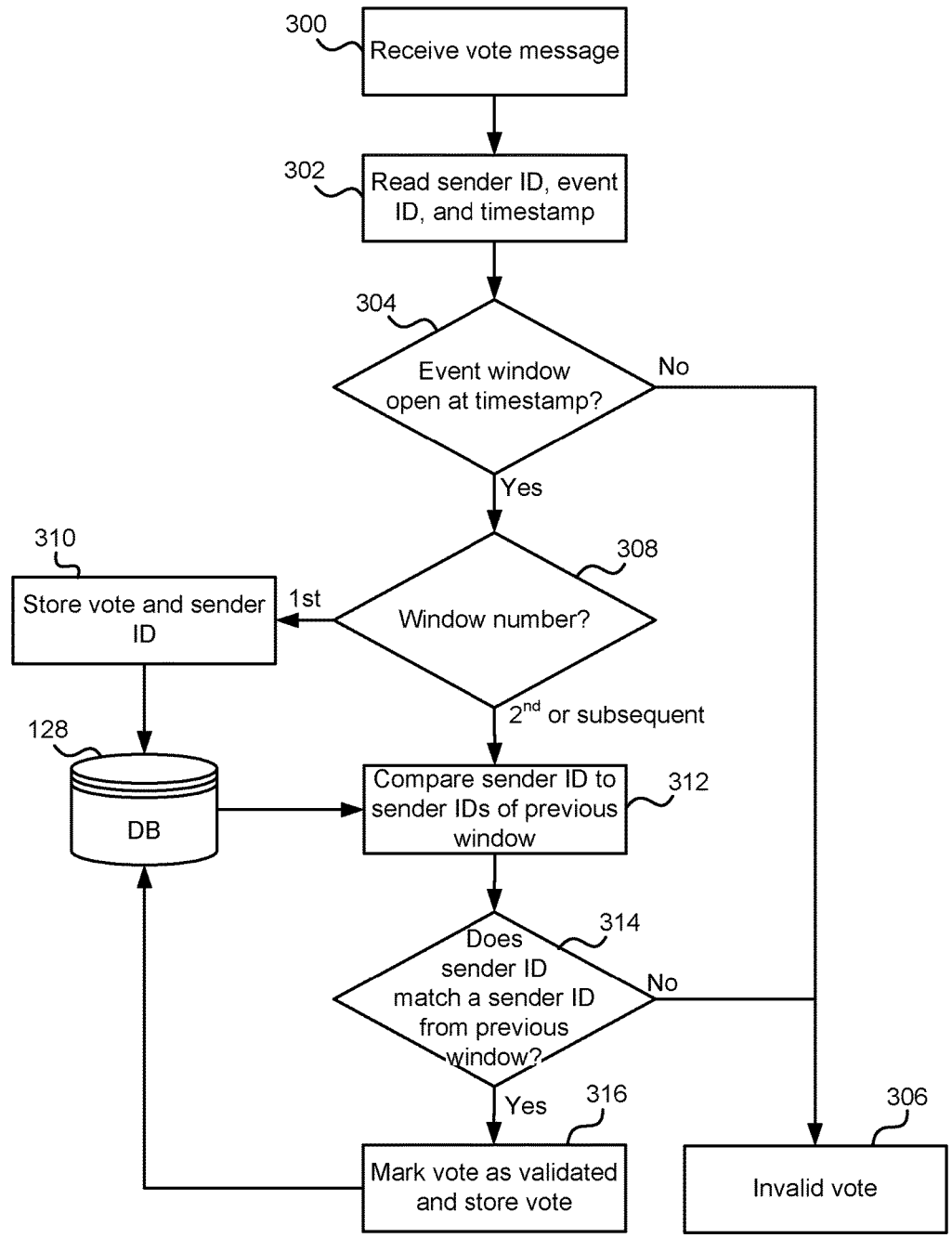
FIG. 3 illustrates a flowchart of a vote validation process.
Figure 4:
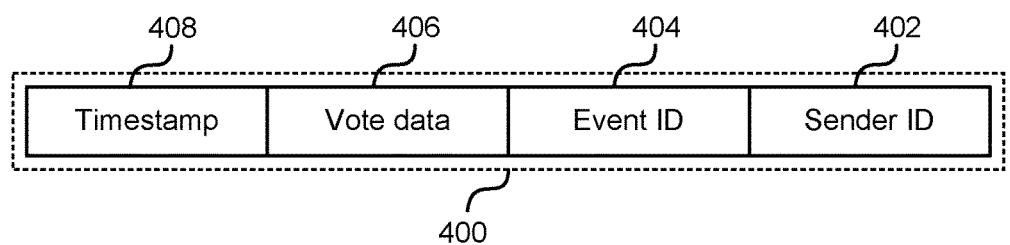
FIG. 4 illustrates an example vote message structure.

Reference is now made to FIG. 3, which illustrates the process performed by the ISS node 126 to receive, validate and store the vote messages (as mentioned with reference to steps 208 and 218 in FIG. 2, above). In step 300, the ISS node 126 receives a vote message from a user 100. The structure of an example vote message is shown illustrated in FIG. 4. The vote message 400 comprises a field for a sender identifier 402, the event identifier 404, vote data 406 and a timestamp 408. Note that the precise structure of the vote message shown in FIG. 4 is merely an example, and the message can comprise further or fewer fields, or the fields can be in a different sequence or distributed over several messages.

The sender identifier 402 is an identifier that is unique to the user and/or the device that transmitted the vote (or at least unique among the users 100). The sender identifier 402 can be generated by the ISS node 126 and allocated to a user when registering to use the voting system. Alternatively, the sender identifier 402 can be based on a credential selected by the user to register with the voting system, such as a username, a password, a linked email address, a mobile telephone number, etc., or a combination thereof. Alternatively, the sender identifier can be based on the hardware used to transmit the vote message 400. For example, the sender identifier can be based on an IP address, a MAC address or hardware serial number. The sender identifier can also optionally be obfuscated to prevent the voting system being able to link specific votes to individual users. This can be achieved for example by using a sender identifier that is a hash of one of the above-mentioned credentials.

The event identifier 404 was mentioned previously as an optional identifier generated to identify the specific event for which the votes are being submitted. The use of an event identifier 404 enables the ISS node 126 to accurately identify which event a given user is voting on. This can be useful, for example, if several separate events have occurred such that there is an overlap between the time windows for voting on these events. In such cases, the event identifier 404 enables a particular vote to be associated with the correct event. In addition, in other examples, the ISS node 126 can be performing the vote processing for several concurrent broadcasts (e.g. for several different TV channels). In such cases, it is possible for the time windows for voting on events occurring in different broadcasts can overlap, in which case the event identifier enables the votes to be associated with the correct event.

As mentioned, the event identifier can be provided to the users 100 and/or the uplink devices via the notification message (step 204 in FIG. 2), and hence the event identifier 404 can be incorporated into the vote message. Alternatively, the uplink devices can fetch the event identifier for a current event from the ISS node 126 prior to submitting a vote message. In the case where the system is restricted to having only a single event that the users can vote on at any one time instance, then the event identifier can be omitted, and the event determined from the timestamp 408 of the message.

The vote data 406 defines the value of the user's vote. For example, in the football application mentioned above, the vote data 406 could represent 'agree', 'disagree' or 'unsure'. In order to form a compact, and hence rapidly transmitted and processed vote message 400, the vote data 406 can be encoded (e.g. using two bits to represent the above three options). In some examples, the event identifier 404 can be used to set the vote data options that are available to the user. For example, the event identifier 404 can comprise data that notifies the uplink device that the event is a football decision, and hence the three options 'agree', 'disagree' or 'unsure' are available, whereas if the event identifier 404 indicates that a different type of event is occurring, then different options such as an 'A', 'B', 'C' or 'D' selection can be available.

The timestamp 408 in the vote message 400 is used to provide an indication of the point in time when the vote message 400 was transmitted. The timestamp 408 is used to determine which voting window a vote message should be counted in, as described in more detail below. However, network congestion and processing delays mean that vote messages sent from the users 100 are not instantly received at the ISS node 126, and the vote messages from different users experience different delays. Therefore, the purpose of the timestamp is to ensure that a vote is not allocated to an incorrect time window. This can be achieved using the two different techniques outlined below.

In the first technique, the uplink devices set the timestamp as the time instance at which the vote message 400 is transmitted by the user. However, for this technique to enable accurate determination of the transmission time, each of the uplink devices and the ISS node 126 should be synchronised to a particular time source. This can be achieved, for example, if a set top box is being used (such as STB 120) which is receiving the real-time content as a digital television signal. The STB 120 can then read a time signal from the transport stream and use this to define the instance of transmitting the vote message. The ISS node 126 can also have access to the digital television signal, and hence access to the same time signal, and can use this to determine the precise time of transmission. This time signal is the same for all the users viewing the real-time content by the same method (i.e. the same digital broadcast).

Similarly, if the mobile telephone 122 is being used as the uplink device, and the mobile telephone 122 is connected to a 3G network, then a precise time signal is available over the 3G network that can be used to set the timestamp 408 at the time of transmission. Other sources of precise timing information can also be used, such as GPS signals. Alternatively, dedicated hardware devices 124 can be provided with a bespoke time signal synchronised with the ISS node 126 (particularly for in-studio deployments).

The first technique is therefore technically complex as it requires time synchronisation of all the users and the ISS node 126. This is particularly complex in the case that the users 100 are using a variety of types of uplink devices, and in the case that the users 100 are receiving the real-time content via a variety of different broadcast technologies (e.g. analogue or digital, terrestrial or satellite, or internet streaming).

In the second, preferred technique, the timestamp records the time of receipt at the ISS node 126. Therefore, the vote message 400 does not comprise the timestamp 408 when it is initially sent, but this is appended to the vote message 400 when it is received at the ISS node 126. This technique does not require all the uplink devices and the ISS node 126 to be synchronised to a common time source. However, this limits the accuracy of the determination of the time of transmission, as the ISS node can only determine that the vote message 400 was transmitted at the latest at the time of receipt, but could, in reality, have been transmitted earlier and was subjected to network delays. This can result in a vote being transmitted whilst a first time window was open, but being received in a second, later time window. In such cases the ISS node 126 cannot tell that the vote message was sent when the first time window was open, as only the time of receipt is recorded. A vote message validation technique is used to prevent this affecting the vote results, as will be described hereinafter. Note that a combination of the first and second technique could also be used.

Figure 5:
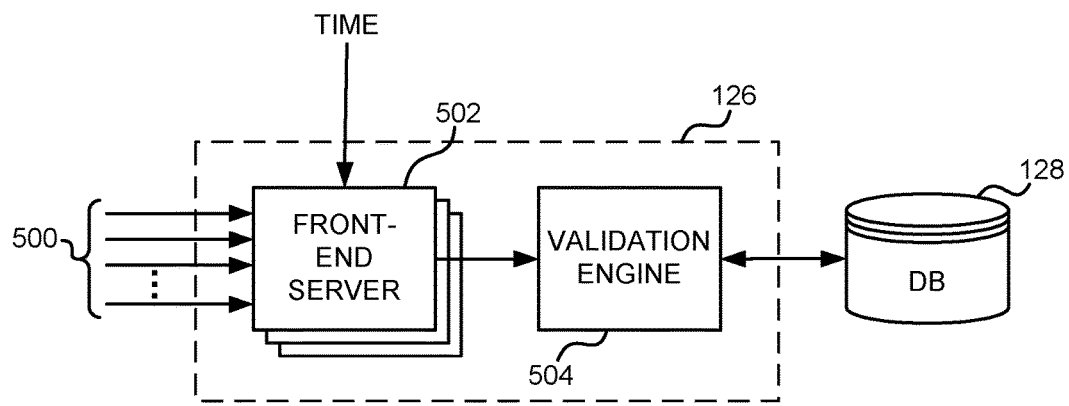
FIG. 5 illustrates a schematic diagram of a vote validation system.

To reduce the effect of processing delays, the ISS node 126 can comprise a fast timestamping system such as that shown in FIG. 5. When a plurality of vote messages 500 are received at the ISS node 126, they are first input to a front-end server 502. The front-end server 502 also receives as input a time-source that is available to the other ISS node processes. The purpose of the front-end server 502 is to receive an incoming vote message and append a timestamp in the form of the current time to the vote message. The front-end server 502 is designed to perform this operation as quickly as possible, in order to timestamp large numbers of incoming vote messages 500 with the minimum of delay. Once the vote messages 500 have been timestamped, they can be passed to a validation engine 504 (described hereinafter) and processed. As soon as the vote messages 500 have been timestamped, processing delays are less critical, as an accurate time of receipt can be determined for each vote message.

The ISS node 126 can have a plurality of front-end servers in order to service the demand in terms of the number of vote messages. This ensures that the incoming vote messages are time-stamped as soon as possible, thereby minimising delay and increasing the voting accuracy.

Returning to FIG. 3, once the vote message 400 has been received and timestamped, then the following steps are performed by the validation engine 504 of FIG. 5. In step 302, the sender identifier 402, event identifier 404 (if present) and timestamp 408 are read from the vote message 400. In step 304 it is determined whether a time window was open for the event at the time given by the timestamp 408. This can be achieved by using the event identifier to identify a time window for the event, and using the timestamp to determine whether the vote message 400 was received during that time window. In the case that no event identifier is present, but only a single time window can be open at one time, then the timestamp can simply be compared to the open time windows.

If no time windows were open at the timestamp time, then the vote is not valid and can be discarded in step 306. In alternative examples, rather than discarding the vote completely, it can be discounted for the purposes of generating certain statistics, but still stored in the data storage node 128.

If a time window was open at the timestamp instance, then, in step 308 the number of the time window at the timestamp is determined. Specifically, it is determined whether the time window open at the timestamp was the first time window for this event, or whether it was the second or subsequent time window.

If the timestamp records the vote message as being received in the first time window for this event then no further validation is required, and the vote data can be stored in the data storage node 128 in step 310. In addition, the sender identifier 402 is also stored in order to verify later votes, as described below.

If the timestamp records the vote message as being received in the second or subsequent time window for this event then the vote needs to be validated in step 312. To validate the vote message, the data storage node 128 is accessed, and it is determined whether the same sender identifier 402 is stored in association with a vote from the previous time window. For example, if the current time window is the second time window, then it is determined whether the sender identifier is present for a vote made during the first time window. Similarly, if the current time window is the third time window for the event, then it is determined whether there the sender identifier is present for a vote made during the second time window, and so on. In other words, to validate the vote message, the same user must have voted in the previous time window, as well as the current time window.

If it is determined in step 314 that the sender identifier 402 for the vote message does match a sender identifier for a vote received in the previous time window, then, in step 316 the vote message is marked as validated and stored in the data storage node 128. If, however, it is determined in step 314 that the sender identifier 402 for the vote message does not match a sender identifier for a vote received in the previous time window, then, in step 306, the vote is discarded. In alternative examples, rather than discarding the invalidated vote completely, it can be discounted for the purposes of generating certain statistics, but still stored in the data storage node 128. Such votes are not useful for generating statistics on how evolving information affected voting decisions, but can still be useful for some overall aggregate statistics.

The validation process of FIG. 3 therefore solves the problem that vote messages can be delayed during transmission, and hence can be received in a time window that does not reflect the information known to the user at the time the vote message was sent. If these vote messages were included in the statistics generation, then they would affect the results. The validation process also restricts users from starting voting from, for example, half-way through an event. This ensures that the results provide accurate information on the evolution of the voting process, as only complete, matched sequences are marked as validated. Such 'partial' votes can still be stored if required.

Figure 6:
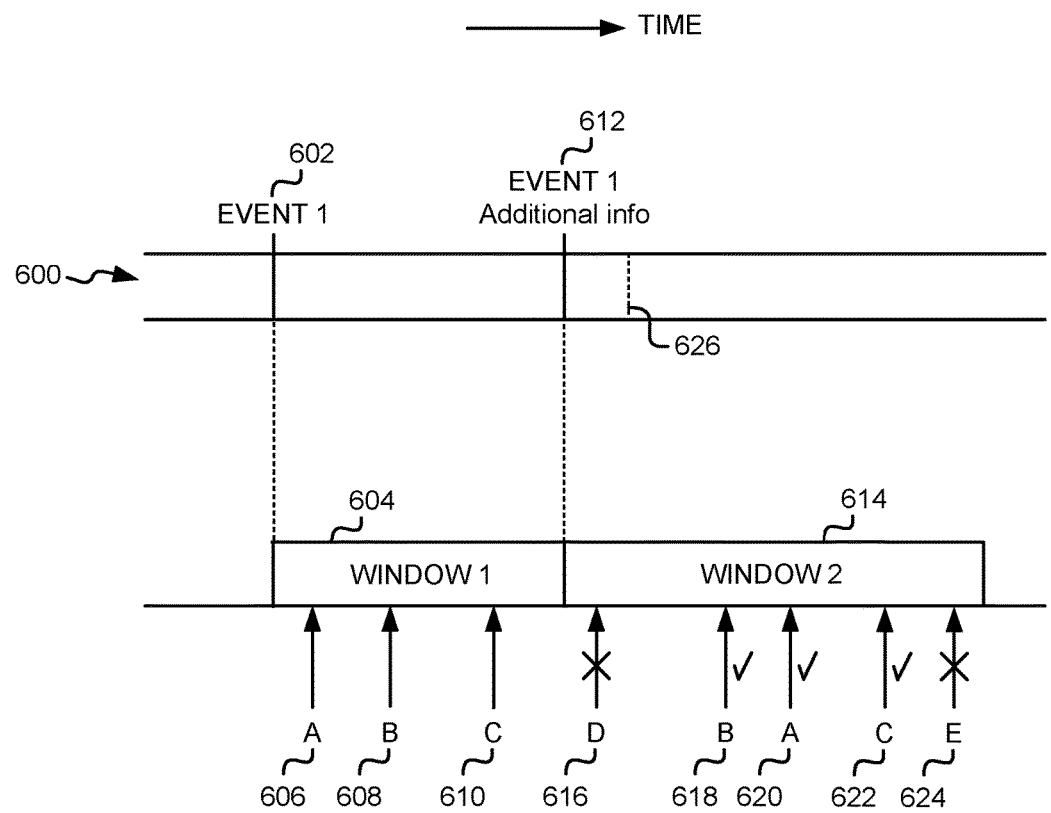
FIG. 6 illustrates an example vote validation time sequence.

The operation of the validation process of FIG. 3 is summarised graphically in FIG. 6. FIG. 6 shows a time sequence of a portion of real-time content 600 (such as a broadcast of a football game). An event (labelled event 1 602) occurs, for example a referee decision in the football game, and a first time window (labelled window 1 604) is opened immediately following the event. During window 1 604 three vote messages are received and stored from user A 606, B 608 and C 610. Subsequently, additional information 612 on event 1 is broadcast to the users. Window 1 604 is closed at the time that the additional information 612 is broadcast, and window 2 614 is opened.

A vote message from user D 616 was transmitted before the closure of window 1 604, but received in window 2 614 due to network delays. To avoid this vote being incorrectly interpreted as being sent with knowledge of the additional information the validation process checks whether a vote message from user D was received in window 1 604. As this was not the case, the vote message from user D 616 is marked as invalid, and does not incorrectly affect the statistics. Vote messages from user B 618, A 620 and C 622 are received in window 2 614, and because these same users all voted in window 1 604, these votes are marked as valid and contribute to the statistics. A new user, user E 624, starts voting for the first time halfway though the event in window 2 614, and the vote message from this user is invalid as no corresponding vote from user E was received in window 1 604.

Note that the broadcast of the additional information 612 can have a duration indicated by dashed line 626. In some examples, the opening of window 2 can be delayed until the broadcast of the additional information 612 (e.g. the replay) has been completed. This avoids votes being counted that are not a result of the entirety of the additional information. This can depend on the type of additional information being broadcast, as some additional information (such as a particular fact) can be instantly appreciated, and hence do not require a delay to the window opening.

Figure 7:
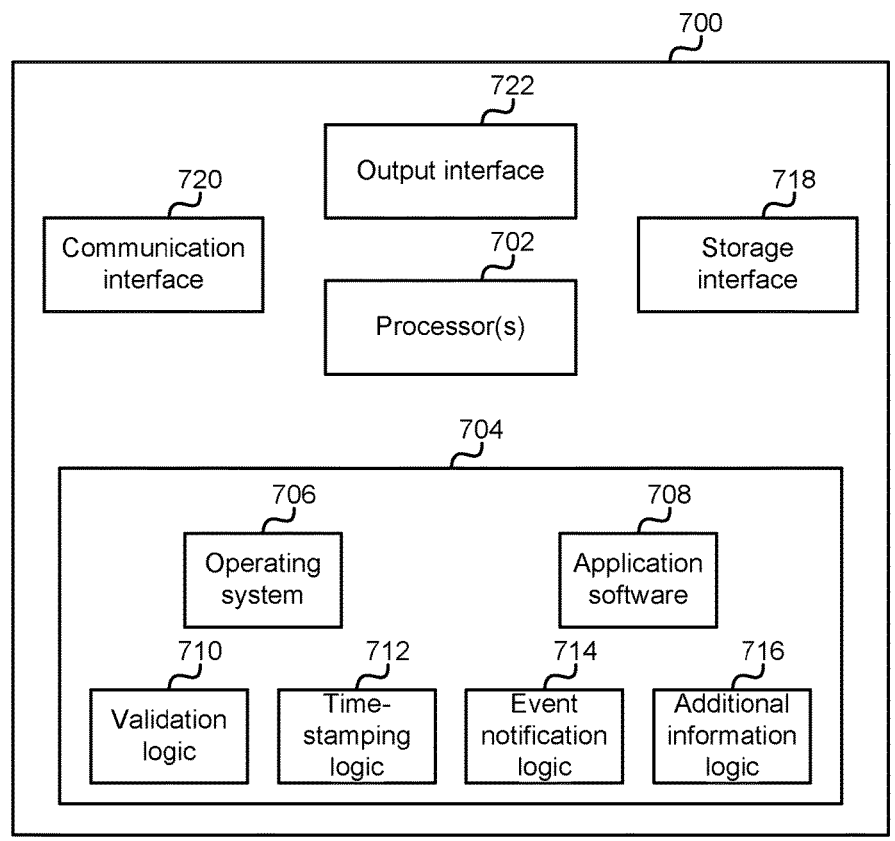
FIG. 7 illustrates an exemplary computing-based device in which embodiments of the vote validation and timestamping can be implemented.

Reference is now made to FIG. 7, which illustrates various components of an exemplary computing-based device 700 which can be implemented as any form of a computing and/or electronic device, and in which embodiments of the techniques for timestamping and/or validating the electronic votes described herein can be implemented. In other words, the computing-based device 700 can be used to implement the ISS node 126.

The computing-based device 700 comprises one or more processors 702 which can be microprocessors, controllers or any other suitable type of processors for processing executable instructions to control the operation of the device in order to perform the techniques described herein.

The computer executable instructions can be provided using any computer-readable media, such as memory 704. The memory 704 is of any suitable type such as random access memory (RAM), a disk storage device of any type such as a magnetic or optical storage device, a hard disk drive, or a CD, DVD or other disc drive. Flash memory, EPROM or EEPROM can also be used.

Platform software comprising an operating system 706 or any other suitable platform software can be provided on the memory 704 of the computing-based device to enable application software 708 to be executed on the device. Other software functions can comprise one or more of:

Validation logic 710 configured validate vote messages by comparing sender identities to those received in a previous time window;

Timestamping logic 712 configured to apply a timestamp to incoming vote messages;

Event notification logic 714 configured to communicate with the IP node 130 and MIG node 134 and transmit notifications to the users of events on which they can vote; and Additional information logic 716 configured to communicate with the MIG node 134 and control the opening and closing of windows and notification thereof in response to the broadcast of additional information.

The computing-based device 700 also comprises a storage interface 718, which is arranged to communicate with the data storage node 128 for the storing of the vote messages. Note that in some examples, the data storage node 128 can be integral with the computing-based device 700.

The computing-based device 700 further comprises a communication interface 720, which is arranged to communicate with the communication network 118. The communication interface 720 can also be used to transfer data internally between elements of the computing-based device 700, such as between the one or more processors 702, the memory 704, the storage interface 718, or any combination thereof.

An output interface 722 can optionally be provided, such as an audio and/or video output to a display device integral with or in communication with the computing-based device 700. The display device can provide a graphical user interface, or other user interface of any suitable type.

Those skilled in the art will realise that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of this invention.

The invention claimed is:

1. A computer-implemented method of determining the impact of additional information on voting results, adapted to be executed as a set of instructions by a processor, the method comprising:

receiving at a network element via a communication network a received vote message comprising a sender identifier, vote data and a timestamp;

determining from the timestamp that the received vote message was received in a time window relating to an event, wherein the start of the time window relating to the event is defined by the time of broadcast of additional information regarding the event;

accessing stored vote messages received at the network element during a previous time window relating to the event and stored at a data storage node, wherein the start of the previous time window relating to the event is defined by the first time of broadcast of the event;

comparing the sender identifier to a stored sender identifier in one of the stored vote messages received during the previous time window;

in response to determining that the sender identifier matches a sender identifier for a stored vote message received in the previous time window, marking the vote message as validated and storing the vote message in the data storage node;

in response to determining that the sender identifier does not match a sender identifier for a stored vote message received in the previous time window, discarding the vote message;

wherein, to validate the received vote message, the same voter must have voted in the previous time window, as well as the current time window, thereby restricting the voter from starting voting partway through the event, whereby only a complete, matched sequence of vote messages for the sender identifier is marked as validated, so as to provide accurate information on the evolution of the voting process, and comparing the vote data from the received vote message to vote data from the stored vote message having the corresponding sender identifier, and determining whether the additional information caused the voter to change vote.

2. A method according to claim 1, wherein the event is an event occurring in a real-time video broadcast.

3. A method according to claim 1, wherein the end of the previous time window relating to the event is defined by the time of broadcast of the additional information regarding the event.

4. A method according to claim 1, wherein the vote data comprises a vote code indicating a voter's opinion regarding the event.

5. A method according to claim 1, wherein the received vote message further comprises an event identifier, wherein the determining further comprises verifying that the event identifier identifies the event, and wherein the validating the received vote message further comprises matching the event identifier to a stored event identifier in the one of the stored vote messages.

6. A method according to claim 1, further comprising transmitting a notification message to at least one user terminal indicating the start of the time window.

7. A method according to claim 1, further comprising:
receiving at a front-end server an unprocessed message comprising the sender identifier and vote data;
determining the time of receipt of the unprocessed message at the front-end server;
adding the time of receipt to the unprocessed message as the timestamp to form the vote message; and
providing the vote message to the network element.

8. A non-transitory computer readable medium storing instructions for execution by a processor to perform a method of determining the impact of additional information on voting results, the method comprising:
receiving at a network element via a communication network a received vote message comprising a sender identifier, vote data and a timestamp;
determining from the timestamp that the received vote message was received in a time window relating to an event, wherein the start of the time window relating to the event is defined by the time of broadcast of additional information regarding the event;
accessing stored vote messages received at the network element during a previous time window relating to the event and stored at a data storage node, wherein the start of the previous time window relating to the event is defined by the first time of broadcast of the event;
comparing the sender identifier to a stored sender identifier in one of the stored vote messages received during the previous time window;
in response to determining that the sender identifier matches a sender identifier for a stored vote message received in the previous time window, marking the vote message as validated and storing the vote message in the data storage node;
in response to determining that the sender identifier does not match a sender identifier for a stored vote message received in the previous time window, discarding the vote message;
wherein, to validate the received vote message, the same voter must have voted in the previous time window, as well as the current time window, thereby restricting the voter from starting voting partway through the event, whereby only a complete, matched sequence of vote messages for the sender identifier is marked as validated, so as to provide accurate information on the evolution of the voting process, and
comparing the vote data from the received vote message to vote data from the stored vote message having the corresponding sender identifier, and determining whether the additional information caused the voter to change vote.

9. A networked server computer, comprising:
at least one processor;
a data store;
a communication interface connected to a communication network and arranged to receive a received vote message comprising a sender identifier, vote data and a timestamp; and
a memory arranged to store executable instructions arranged to cause the at least one processor to:
determine from the timestamp that the received vote message was received in a time window relating to an event, wherein the start of the time window relating to the event is defined by the time of broadcast of additional information regarding the event;
access stored vote messages received during a previous time window relating to the event and stored in the data store, wherein the start of the previous time window relating to the event is defined by the first time of broadcast of the event;
compare the sender identifier to a stored sender identifier in one of the stored vote messages received during the previous time window;
in response to determining that the sender identifier matches a sender identifier for a stored vote message received in the previous time window, mark the vote message as validated and storing the vote message in the data storage node;
in response to determining that the sender identifier does not match a sender identifier for a stored vote message received in the previous time window, discard the vote message;
wherein, to validate the received vote message, the same voter must have voted in the previous time window, as well as the current time window, thereby restricting the voter from starting voting partway through the event, whereby only a complete, matched sequence of vote messages for the sender identifier is marked as validated, so as to provide accurate information on the evolution of the voting process, and
compare the vote data from the received vote message to vote data from the stored vote message having the corresponding sender identifier, and determine whether the additional information caused the voter to change vote.

10. An electronic vote validation system, comprising:
a networked server computer, comprising:
a processor,
a data store,
a communication interface connected to a communication network and arranged to receive a received vote message comprising a sender identifier, vote data and a timestamp, and
a memory arranged to store executable instructions arranged to cause the processor to:
determine from the timestamp that the received vote message was received in a time window relating to an event, wherein the start of the time window relating to the event is defined by the time of broadcast of additional information regarding the event;
access stored vote messages received during a previous time window relating to the event and stored in the data store, wherein the start of the previous time window relating to the event is defined by the first time of broadcast of the event;

compare the sender identifier to a stored sender identifier in one of the stored vote messages received during the previous time window;

in response to determining that the sender identifier matches a sender identifier for a stored vote message received in the previous time window, mark the vote message as validated and storing the vote message in the data storage node;

in response to determining that the sender identifier does not match a sender identifier for a stored vote message received in the previous time window, discard the vote message;

wherein, to validate the received vote message, the same voter must have voted in the previous time window, as well as the current time window, thereby restricting the voter from starting voting partway through the event, whereby only a complete, matched sequence of vote messages for the sender identifier is marked as validated, so as to provide accurate information on the evolution of the voting process, and compare the vote data from the received vote message to vote data from the stored vote message having the corresponding sender identifier, and determine whether the additional information caused the voter to change vote; and at least one front-end server computer, comprising:
a processor;
a communication interface connected to the communication network and arranged to receive an unprocessed message comprising the sender identifier and vote data; and
a memory arranged to store executable instructions arranged to cause the processor to:
determine the time of receipt of the unprocessed message at the at least one front-end server;
add the time of receipt to the unprocessed message as the timestamp to form the vote message; and
provide the vote message to the networked server computer via the communication interface.

\* \* \* \* \*